UNITED STATES PATENT OFFICE.

CHARLES B. STOWE, OF LAKEWOOD, OHIO.

REFRACTORY MATERIAL AND PROCESS OF MAKING SAME.

1,265,545.　　　　　Specification of Letters Patent.　　Patented May 7, 1918.

No Drawing.　　　Application filed August 29, 1917.　Serial No. 188,805.

*To all whom it may concern:*

Be it known that I, CHARLES B. STOWE, a citizen of the United States, residing at Lakewood, in the county of Cuyahoga and State of Ohio, has invented certain new and useful Improvements in Refractory Materials and Processes of Making Same, of which the following is a specification.

This invention relates to bricks or other molded articles which are made of certain refractory materials, and to a process of making them. Bricks made according to my invention are particularly useful for lining furnaces in which metals are to be melted, which linings are obliged to withstand high temperatures and the mechanical and chemical erosive actions of the metals which are treated in the furnaces.

My invention is useful also in the manufacture of molded articles other than bricks, such, for instance, as gate molds for thermit castings, and other special shapes of molded articles used in the linings of furnaces, ladles, retorts, crucibles, etc., in which molten metal is treated, or which may be used for containing or pouring molten metal.

In general, my process consists of forming bricks or other molded articles out of moist magnesite (magnesium carbonate), or magnesium oxid, then coating them with pulverized iron ore, such as hematite, or with pulverized rolling mill scale, or with other convenient form of pulverized iron oxid, and then burning them. Or, the molded articles may first be dried or burned, then dipped into a paste or mud of iron oxid and water or other fluid, and then burned.

In burning the molded articles when coated with the dry pulverized iron oxid or when coated with iron oxid mud, the temperature is brought to such a degree that a portion of the iron oxid is drawn into and unites with the magnesium oxid and forms a sheath of refractory material composed of magnesium oxid and iron oxid, with possibly some silica and calcium oxid, if they be present in the original materials. This sheath has a lower melting point than that of magnesium oxid. Its outer surface is apparently composed of iron oxid only, and the bricks or other molded articles, when burned as above described, and allowed to cool, have the appearance of iron castings. The surfaces are hard and dense, and the bricks are mechanically strong enough to be used in furnace linings. Under the action of heat, and particularly when in contact with molten steel, the exposed surface of the lining becomes plastic; the sheath of lower eutectic material gradually becomes deeper; the iron oxid coating may be melted and gradually absorbed by the magnesium oxid or carried away by the molten metal in contact with it; but a coating of what appears to be iron oxid remains upon the exposed surfaces of the linings after the molten metal has been withdrawn from the furnace. The mechanical and chemical erosive actions of molten metals upon these linings are slight. The linings are therefore durable.

In Patent No. 792,882, of June 20, 1905, to Davison, and also in my Patent, No. 1,205,056, of November 14, 1916, there are disclosed processes for making refractory materials by burning magnesite (magnesium carbonate), together with iron oxid. In my present invention, I employ some of the principles of the processes disclosed in these patents. I have found that when magnesium carbonate, $MgCO_3$, is burned with iron oxid, $Fe_2O_3$, that carbon di-oxid, $CO_2$, is driven off from the magnesium carbonate, and that magnesium oxid, $MgO$, unites with the iron oxid, $Fe_2O_3$, forming a basic refractory material which resists the chemical and mechanical erosive actions of molten steel to a marked degree.

Magnesium oxid, $MgO$, which is obtained by calcining magnesium carbonate, $MgCO_3$, is of itself a highly refractory material, but it has very little mechanical strength, and cannot be successfully made into bricks or other molded shapes without the use of a binder. Moreover, the melting point of magnesium oxid, $MgO$, is so high, that at the temperatures ordinarily reached in the boiling of steel or other metals, magnesium oxid does not become plastic, and, if the linings of a furnace were to be made of magnesium oxid brick, they would rapidly crumble away.

When magnesium oxid and iron oxid are united as they are in the processes described in Patent No. 792,882, to Davison, and in my Patent No. 1,205,056, the mechanical strength of the refractory material thus formed is greatly increased. Bricks and other molded articles can be made of these materials when ground and mixed with water. The melting point is reduced from that of magnesium oxid so that at the temperatures reached in the boiling of steel and other metals, the materials become somewhat plastic; do not crumble or become otherwise eroded by the chemical and mechanical actions of the molten metal and slags used; and form very durable furnace linings. I have found that when magnesium carbonate and iron oxid are intimately mixed and burned together, the iron oxid will unite with the magnesium oxid readily. I have found also that when iron oxid is burned with magnesium oxid, they do not readily combine, and it appears, although I have not definitely established it to be a fact, that iron oxid combines with magnesium oxid only at the time that carbon di-oxid is being driven off from the mixture. It is a well known fact that in the burning of magnesium carbonate, it is difficult to drive off all of the carbon di-oxid. Even after the magnesium carbonate has apparently lost all of its carbon di-oxid, the magnesium oxid seems to absorb more carbon di-oxid from the atmosphere so that magnesium oxid practically always contains more or less magnesium carbonate. The fact that magnesium oxid always contains some magnesium carbonate mixed with it, is, I believe, the reason why it is possible for me to carry out the process of my present invention and produce the refractory products of my process by starting with either magnesium carbonate or so called magnesium oxid.

It is well known that when magnesium carbonate is calcined to drive off its carbon dioxid, the resultant mass of material, magnesium oxid, is very much shrunken in volume as well as in weight, due to the loss of the carbon di-oxid. In carrying out my present invention, I therefore prefer to use calcined magnesium carbonate, preferably that which is commercially known as "soft burned" magnesite, as such materials are already shrunken. I may, however, employ "dead burned" magnesite, as I find that even this material contains sufficient carbon di-oxid for the purposes of my process. I may also employ and have successfully employed the products of the processes of either the Davison Patent, No. 792,882, or of my Patent, No. 1,205,056, which products are combinations of magnesium oxid with iron oxid, or magnesium oxid with iron oxid and silica, as I have found that these products also contain sufficient carbon di-oxid for the successful formation of the outer sheath upon the molded shapes that I have above described. The advantage of using pre-calcined, or pre-burned material, lies in the fact that such materials have already been shrunken in volume, depending upon the extent to which the carbon di-oxid has been expelled, so that the further burning of the molded shapes which have been coated with iron oxid in the manner I have described, results in very little shrinkage. By careful mixing and molding, I have been able to produce fairly satisfactory molded shapes by using unburned magnesium carbonate. It is necessary, however, in such case, to make a proper allowance for the shrinkage of the material which occurs when it is being burned, and I have found it more satisfactory to use the calcined magnesite as before stated.

Magnesium carbonate as found in natural rocks or deposits always contains impurities such as calcium carbonate, silica, alumina, etc. A small percentage of these impurities is not seriously detrimental to my process or product and it will be understood that I contemplate the use of such materials as may be available, so long as the impurities they contain do not effect a radical change in the operation or result of my process.

Having thus described my invention, I claim and desire to secure by Letters Patent:

1. The process of making a molded article of refractory material which consists of forming the article out of a mixture of magnesium carbonate and water, coating the article with pulverized iron oxid and burning it at a temperature to cause the carbon di-oxid and water of the mixture to be driven off, and to cause some of the iron oxid coating to unite with magnesium oxid at the surface of the article.

2. The process of making a molded article of refractory material which consists of forming the article out of magnesium carbonate with which has been burned iron oxid, coating the article with pulverized iron oxid, and then burning it at a temperature which will cause a portion of the iron oxid to unite with the surface material of the body of the article.

3. A molded article composed of basic refractory material such as magnesium oxid having a sheath formed by first coating the article with iron oxid carrying material, and then burning the article so coated at a temperature which will cause a portion of the iron oxid to chemically unite with some of the material of which the body of the article is composed.

4. The process of making a molded article of refractory material which consists of forming the article out of a mixture of magnesium carbonate and water, coating the article with pulverized metallic oxid and burning it at a temperature to cause the carbon di-oxid and water of the mixture to be driven off, and to cause some of the metallic oxid coating to unite with magnesium oxid at the surface of the article.

5. The process of making a molded article of refractory material which consists of forming the article out of magnesium carbonate with which has been burned a metallic oxid, coating the article with pulverized metallic oxid of the same kind, and then burning it at a temperature which will cause a portion of the metallic oxid to unite with the surface material of the body of the article.

6. A molded article composed of basic refractory material such as magnesium oxid having a sheath formed by first coating the article with metallic oxid carrying material, and then burning the article so coated at a temperature which will cause a portion of the metallic oxid to chemically unite with some of the material of which the body of the article is composed.

In testimony whereof I affix my signature in the presence of two witnesses.

CHARLES B. STOWE.

Witnesses:
 Leon H. Ingalls,
 Augustine Ingalls.